United States Patent
Zhu et al.

(10) Patent No.: US 11,496,437 B2
(45) Date of Patent: Nov. 8, 2022

(54) SELECTIVE ARP PROXY

(71) Applicant: VMware, Inc., Palo Alto, CA (US)

(72) Inventors: Hongwei Zhu, Mountain View, CA (US); Dileep Devireddy, San Jose, CA (US); Ganesan Chandrashekhar, Campbell, CA (US); Feng Gu, Mountain View, CA (US); Sreenivas Duvvuri, San Ramon, CA (US); Chidambareswaran Raman, Sunnyvale, CA (US)

(73) Assignee: VMWARE, INC., Palo Alto, CA (US)

( * ) Notice: Subject to any disclaimer, the term of this patent is extended or adjusted under 35 U.S.C. 154(b) by 146 days.

(21) Appl. No.: 16/906,703

(22) Filed: Jun. 19, 2020

(65) Prior Publication Data

US 2021/0314288 A1    Oct. 7, 2021

Related U.S. Application Data (60) Provisional application No. 63/005,704, filed on Apr. 6, 2020.

(51) Int. Cl.
*G06F 15/16* (2006.01)
*H04L 61/103* (2022.01)
(Continued)

(52) U.S. Cl.
CPC ............ *H04L 61/103* (2013.01); *H04L 49/70* (2013.01); *H04L 61/59* (2022.05)

(58) Field of Classification Search
CPC .................................................. H04L 61/103
See application file for complete search history.

(56) References Cited

U.S. PATENT DOCUMENTS 6,016,316 A   1/2000 Moura et al.
6,456,624 B1  9/2002 Eccles et al.
(Continued)

FOREIGN PATENT DOCUMENTS

EP    2566129 A1    3/2013
WO    2008095010 A1    8/2008
(Continued)

OTHER PUBLICATIONS

Plummer, David, "An Ethernet Address Resolution Protocol or Converting Network Protocol Addresses to 48.bit Ethernet Address for Transmission on Ethernet Hardware," RFC 826, Nov. 1982, 10 pages.

(Continued)

*Primary Examiner* — Guang W Li
(74) *Attorney, Agent, or Firm* — Adeli LLP (57) ABSTRACT

Some embodiments provide a method for proxying ARP requests. At an MFE that executes on a host computer operating at a first site to implement a distributed router along with at least one additional MFE at the first site, the method receives, from a router at a remote second site, an ARP request for an IP address associated with a logical switch that spans the first site and the remote second site, and to which both the distributed router and the router at the remote second site connect. The method determines whether a table that includes IP addresses for a set of DCNs that use the distributed router as a default gateway includes the IP address. When the IP address is in the table, the method proxies the request at the host computer. When the particular IP address is not in the table, the MFE does not proxy the request.

20 Claims, 6 Drawing Sheets

(51) Int. Cl.
*H04L 49/00* (2022.01)
*H04L 61/59* (2022.01)

(56) References Cited

U.S. PATENT DOCUMENTS

| | | |
|---|---|---|
| 6,493,767 B1 | 12/2002 | Ishida et al. |
| 6,751,221 B1 | 6/2004 | Saito et al. |
| 6,862,264 B1 | 3/2005 | Moura et al. |
| 7,009,974 B1 | 3/2006 | Fotedar |
| 7,260,648 B2 | 8/2007 | Tingley et al. |
| 7,478,173 B1 | 1/2009 | Delco |
| 7,542,468 B1 * | 6/2009 | Begley ............... H04L 61/2015 370/389 |
| 7,660,287 B2 | 2/2010 | Axelsson et al. |
| 7,760,735 B1 | 7/2010 | Chen et al. |
| 7,802,000 B1 | 9/2010 | Huang et al. |
| 7,818,452 B2 | 10/2010 | Matthews et al. |
| 7,948,986 B1 | 5/2011 | Ghosh et al. |
| 8,190,767 B1 | 5/2012 | Maufer et al. |
| 8,614,820 B2 | 12/2013 | Kamei |
| 8,897,303 B2 * | 11/2014 | Xiong ................ H04L 12/4675 370/392 |
| 9,264,313 B1 | 2/2016 | Manuguri et al. |
| 9,319,336 B2 | 4/2016 | Thakkar et al. |
| 9,531,676 B2 | 12/2016 | Wang et al. |
| 9,548,965 B2 | 1/2017 | Wang et al. |
| 9,992,106 B2 * | 6/2018 | Wang .................. G06F 9/45558 |
| 10,142,160 B1 * | 11/2018 | Adams ................... H04L 41/12 |
| 10,593,174 B1 * | 3/2020 | Yoon ................... G08B 25/008 |
| 10,798,048 B2 | 10/2020 | Lim et al. |
| 2002/0013858 A1 | 1/2002 | Anderson |
| 2003/0026258 A1 | 2/2003 | Takatani et al. |
| 2003/0037163 A1 | 2/2003 | Kitada et al. |
| 2003/0093481 A1 | 5/2003 | Mitchell et al. |
| 2004/0054799 A1 | 3/2004 | Meier et al. |
| 2005/0080891 A1 | 4/2005 | Cauthron |
| 2005/0251856 A1 | 11/2005 | Araujo et al. |
| 2007/0061492 A1 | 3/2007 | Riel |
| 2007/0101323 A1 | 5/2007 | Foley et al. |
| 2007/0110068 A1 | 5/2007 | Sekiguchi et al. |
| 2007/0150341 A1 | 6/2007 | Zia et al. |
| 2007/0286209 A1 | 12/2007 | Wang et al. |
| 2008/0072305 A1 | 3/2008 | Casado et al. |
| 2008/0080512 A1 | 4/2008 | Gofman et al. |
| 2008/0151893 A1 | 6/2008 | Nordmark et al. |
| 2008/0189769 A1 | 8/2008 | Casado et al. |
| 2009/0025077 A1 | 1/2009 | Trojanowski |
| 2009/0028144 A1 | 1/2009 | Blair |
| 2009/0129271 A1 | 5/2009 | Ramankutty et al. |
| 2009/0235325 A1 | 9/2009 | Dimitrakos et al. |
| 2009/0249472 A1 | 10/2009 | Litvin et al. |
| 2010/0115080 A1 | 5/2010 | Kageyama |
| 2010/0141402 A1 | 6/2010 | Eun et al. |
| 2010/0318665 A1 | 12/2010 | Demmer et al. |
| 2011/0022695 A1 | 1/2011 | Dalal et al. |
| 2011/0107331 A1 | 5/2011 | Evans et al. |
| 2011/0142053 A1 | 6/2011 | Merwe et al. |
| 2011/0202920 A1 * | 8/2011 | Takase ................ H04L 29/1233 718/1 |
| 2011/0246633 A1 | 10/2011 | Khosravi et al. |
| 2011/0264610 A1 | 10/2011 | Armstrong et al. |
| 2011/0299402 A1 | 12/2011 | Vobbilisetty et al. |
| 2011/0299537 A1 | 12/2011 | Saraiya et al. |
| 2011/0317703 A1 | 12/2011 | Dunbar et al. |
| 2011/0320821 A1 | 12/2011 | Alkhatib et al. |
| 2012/0014387 A1 * | 1/2012 | Dunbar .................. H04L 45/02 370/395.53 |
| 2012/0158997 A1 | 6/2012 | Hsu et al. |
| 2012/0197973 A1 | 8/2012 | Tukol et al. |
| 2012/0307826 A1 * | 12/2012 | Matsuoka ........... H04L 12/4625 370/390 |
| 2012/0323987 A1 | 12/2012 | Cantu et al. |
| 2013/0034097 A1 | 2/2013 | Dharmapurikar et al. |
| 2013/0044636 A1 * | 2/2013 | Koponen ................ H04L 47/12 370/254 |
| 2013/0044754 A1 * | 2/2013 | Zhu .................... H04L 29/12028 370/392 |
| 2013/0054761 A1 | 2/2013 | Kempf et al. |
| 2013/0060940 A1 | 3/2013 | Koponen et al. |
| 2013/0061047 A1 | 3/2013 | Sridharan et al. |
| 2013/0073743 A1 | 3/2013 | Ramasamy et al. |
| 2013/0148656 A1 | 6/2013 | Zhang et al. |
| 2013/0151676 A1 | 6/2013 | Thakkar et al. |
| 2013/0227550 A1 | 8/2013 | Weinstein et al. |
| 2013/0266015 A1 * | 10/2013 | Qu ........................ H04L 49/70 370/392 |
| 2013/0268930 A1 | 10/2013 | Saidi et al. |
| 2013/0308641 A1 | 11/2013 | Ackley |
| 2013/0322443 A1 * | 12/2013 | Dunbar ................ H04L 12/185 370/390 |
| 2013/0332983 A1 | 12/2013 | Koorevaar et al. |
| 2014/0019639 A1 | 1/2014 | Ueno |
| 2014/0059544 A1 | 2/2014 | Koganty et al. |
| 2014/0068602 A1 | 3/2014 | Gember et al. |
| 2014/0092901 A1 * | 4/2014 | Kapadia ................ H04L 49/356 370/390 |
| 2014/0115578 A1 | 4/2014 | Cooper et al. |
| 2014/0195666 A1 | 7/2014 | Dumitriu et al. |
| 2015/0003453 A1 | 1/2015 | Sengupta et al. |
| 2015/0016469 A1 | 1/2015 | Ganichev et al. |
| 2015/0032691 A1 | 1/2015 | Hall et al. |
| 2015/0043581 A1 * | 2/2015 | Devireddy ............. H04L 49/70 370/392 |
| 2015/0052262 A1 | 2/2015 | Chanda et al. |
| 2015/0052522 A1 | 2/2015 | Chanda et al. |
| 2015/0058463 A1 | 2/2015 | Wang et al. |
| 2015/0058968 A1 * | 2/2015 | Wang ................... H04L 63/1466 726/12 |
| 2015/0103645 A1 | 4/2015 | Shen et al. |
| 2015/0103661 A1 | 4/2015 | Shen et al. |
| 2015/0103842 A1 * | 4/2015 | Chandrashekhar ..... H04L 45/44 370/409 |
| 2015/0106489 A1 | 4/2015 | Duggirala |
| 2015/0172222 A1 * | 6/2015 | Liao ..................... H04L 49/351 370/392 |
| 2015/0180673 A1 | 6/2015 | Kuwata |
| 2015/0180824 A1 | 6/2015 | Atanasov |
| 2015/0215265 A1 | 7/2015 | Lim |
| 2015/0281180 A1 | 10/2015 | Raman et al. |
| 2015/0281274 A1 * | 10/2015 | Masurekar .......... G06F 9/45558 726/22 |
| 2015/0312118 A1 | 10/2015 | Behera et al. |
| 2015/0350043 A1 | 12/2015 | Kovács et al. |
| 2016/0057014 A1 * | 2/2016 | Thakkar ............... G06F 9/45558 709/223 |
| 2016/0127306 A1 | 5/2016 | Wang et al. |
| 2016/0173441 A1 | 6/2016 | Lee et al. |
| 2016/0197876 A1 | 7/2016 | Bui et al. |
| 2016/0226817 A1 * | 8/2016 | Kang ....................... G06F 9/455 |
| 2016/0248601 A1 * | 8/2016 | Nomi ................... H04L 43/0811 |
| 2016/0301655 A1 * | 10/2016 | Lim ..................... H04L 61/6009 |
| 2017/0093618 A1 * | 3/2017 | Chanda ................ H04L 41/0803 |
| 2018/0006969 A1 * | 1/2018 | Venkateshaiah ...... H04L 61/103 |
| 2019/0036868 A1 * | 1/2019 | Chandrashekhar ... H04L 45/021 |
| 2019/0140944 A1 * | 5/2019 | Tang ..................... H04L 45/66 |
| 2019/0342258 A1 * | 11/2019 | Raj ....................... H04L 45/745 |
| 2021/0266255 A1 * | 8/2021 | Ganapathy .......... H04L 12/4633 |

FOREIGN PATENT DOCUMENTS

| | | |
|---|---|---|
| WO | 2012051884 A1 | 4/2012 |
| WO | 2012093429 A1 | 7/2012 |
| WO | 2015030882 A1 | 3/2015 |

OTHER PUBLICATIONS

Author Unknown, "Enabling Service Chaining on Cisco Nexus 1000V Series," Month Unknown, 2012, 25 pages, CISCO.

Dumitriu, Dan Mihai, et al., (U.S. Appl. No. 61/514,990), filed Aug. 4, 2011, 31 pages.

(56) References Cited

OTHER PUBLICATIONS

Elmeleegy, Khaled, et al., "EtherProxy: Scaling Ethernet By Suppressing Broadcast Traffic," IEEE INFOCOM 2009, Apr. 19, 2009, 9 pages, IEEE.
Greenberg, Albert, et al., "VL2: A Scalable and Flexible Data Center Network," SIGCOMM '09, Aug. 17-21, 2009, 12 pages, ACM, Barcelona, Spain.
Guichard, J., et al., "Network Service Chaining Problem Statement," Network Working Group, Jun. 13, 2013, 14 pages, Cisco Systems, Inc.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Kim, Changhoon, et al., "Floodless in SEATTLE: A Scalable Ethernet Architecture for Large Enterprises," SIGCOMM'08, Aug. 17-22, 2008, 12 pages, ACM, Seattle, Washington, USA.
Mann, Vijay, et al., "Crossroads: Seamless VM Mobility Across Data Centers Through Software Defined Networking," IEEE Network Operations and Management Symposium (NOMS), Apr. 16-20, 2012, 9 pages, IEEE, Piscataway, NJ, USA.
Mysore, Radhka Niranjan, et al., "PortLand: A Scalable Fault-Tolerant Layer 2 Data Center Network Fabric," Proc. Of SIGCOMM, Aug. 17-21, 2009, 12 pages.
Narten, Thomas, et al., "Address Resolution Problems in Large Data Center Networks," Jan. 2013, 17 pages, Internet Engineering Task Force (IETF).
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Shah, Himanshu, et al., "ARP Broadcast Reduction for Large Data Centers," draft-shah-armd-arp- reduction-02.txt, Oct. 28, 2011, 11 pages, IETF Trust.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

\* cited by examiner

SELECTIVE ARP PROXY

BACKGROUND

Today, multiple sites (e.g., datacenters, virtual networks, physical networks) can be connected through virtual private networks (VPNs). Virtual machines (VMs) at these sites can be migrated between the sites (e.g., from a remote site to a local site) and communicate on stretched segments (e.g., logical switches). In order to ensure Internet Protocol (IP) traffic is properly routed to the appropriate VMs as the VMs migrate from site to site without re-configuring the migrating VMs, the default gateway IP address for the VMs should remain the same before and after the migration. To do so, the default gateways (e.g., routers, distributed logical routers, etc.) must each use the same IP address. A network management system at each of the sites can configure the VMs to use one of the gateways as a default gateway. Since the VMs are connected through a VPN that is reachable by each of the default gateways, the learnt gateway MAC will oscillate between the different MACs of each of the default gateways. This oscillation, in turn, will interrupt traffic, and thus may result in traffic failures.

BRIEF SUMMARY

Some embodiments provide a method for selectively proxying address resolution protocol (ARP) requests. A managed forwarding element (MFE) that executes on a host computer operating at a first (local) site to implement a distributed logical router receives an ARP request, sent from a router at a second (remote) site for a particular Internet Protocol (IP) address associated with a logical switch (i) that spans the local site and the remote site, and (ii) to which both the router and the distributed logical router connect while sharing a same IP address. The MFE determines whether a table (e.g., a routing table, a separate ARP table, etc.) that includes IP addresses for a set of data compute nodes (DCNs) for which the distributed router is a default gateway includes the particular IP address. When the particular IP address is in the table, the MFE proxies the ARP request at the host computer, and when the particular IP address is not in the table, the MFE does not proxy the ARP request at the host computer. In other words, the MFE only proxies ARP request that include IP address corresponding to DCNs that use the distributed router as a default gateway.

In some embodiments, the MFE proxies the ARP request by sending the ARP request to any DCNs executing on the host computer that connect to the logical switch. If any of these DCNs correspond to the particular IP address, they will send an ARP reply (with the Media Access Control (MAC) address for the DCN) to the MFE. After receiving the ARP reply from the DCN, in some embodiments, the MFE then proxies the ARP reply to the router at the remote site (e.g., through a virtual private network (VPN) between the sites).

The distributed logical router, in some embodiments, is implemented by MFEs at multiple host computers at the first site (e.g., host computers on which DCNs that connect to the logical switch operate). These additional MFEs also receive the ARP request in some embodiments, and perform the same check of their own local copy of the table with IP addresses of DCNs for which the distributed router is the default gateway. In some embodiments, a network management system of the first site that manages a logical network at the first site populates these tables for the MFEs implementing the distributed logical router. Each of these MFEs also proxies the ARP request when the particular IP address is in the table, but only one of the MFEs will receive a reply from their local DCN.

That is, only the MFE that executes on the same host computer as the DCN that corresponds to the IP address in the ARP request will receive the ARP reply. When the MFE that receives the ARP reply proxies the received ARP reply to the router at the remote site, in some embodiments, an MFE that initially received the ARP request from the remote site (and distributed the ARP request to the other MFEs implementing the distributed logical router at the local site) checks the destination MAC address of the ARP reply as it is proxied to the router at the remote site. The router and the distributed router, in some embodiments, share a same IP address, but maintain different MAC addresses. Accordingly, in some such embodiments, based on the destination MAC address of the ARP reply, the MFE will not intercept the ARP reply.

When the particular IP address is not in the table, the MFEs do not proxy the ARP requests. Instead, in some embodiments, the ARP reply reaches the DCN that corresponds to the particular IP address directly, and the DCN will, in turn, send the ARP reply back to the router at the remote site. In some embodiments, the MFEs that implement the distributed router check the destination MAC address of the ARP reply as it passes through to the router at the remote site (i.e., because the distributed router shares a same IP address as the router at the remote site, but maintains a different MAC address), and based on the destination MAC address of the ARP reply, do not intercept the ARP reply.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, the Detailed Description, the Drawings, and the Claims is needed. Moreover, the claimed subject matters are not to be limited by the illustrative details in the Summary, the Detailed Description, and the Drawings.

DETAILED DESCRIPTION

Some embodiments provide a method for selectively proxying address resolution protocol (ARP) requests. A managed forwarding element (MFE) that executes on a host computer operating at a first (local) site to implement a distributed logical router receives an ARP request, sent from a router at a second (remote) site for a particular Internet Protocol (IP) address associated with a logical switch (i) that spans the local site and the remote site, and (ii) to which both the router and the distributed logical router connect while sharing a same IP address. The MFE determines whether a table (e.g., a routing table, a separate ARP table, etc.) that includes IP addresses for a set of data compute nodes (DCNs) for which the distributed router is a default gateway includes the particular IP address. When the particular IP address is in the table, the MFE proxies the ARP request at the host computer, and when the particular IP address is not in the table, the MFE does not proxy the ARP request at the host computer. In other words, the MFE only proxies ARP requests that include IP address corresponding to DCNs that use the distributed router as a default gateway.

Figure 1:
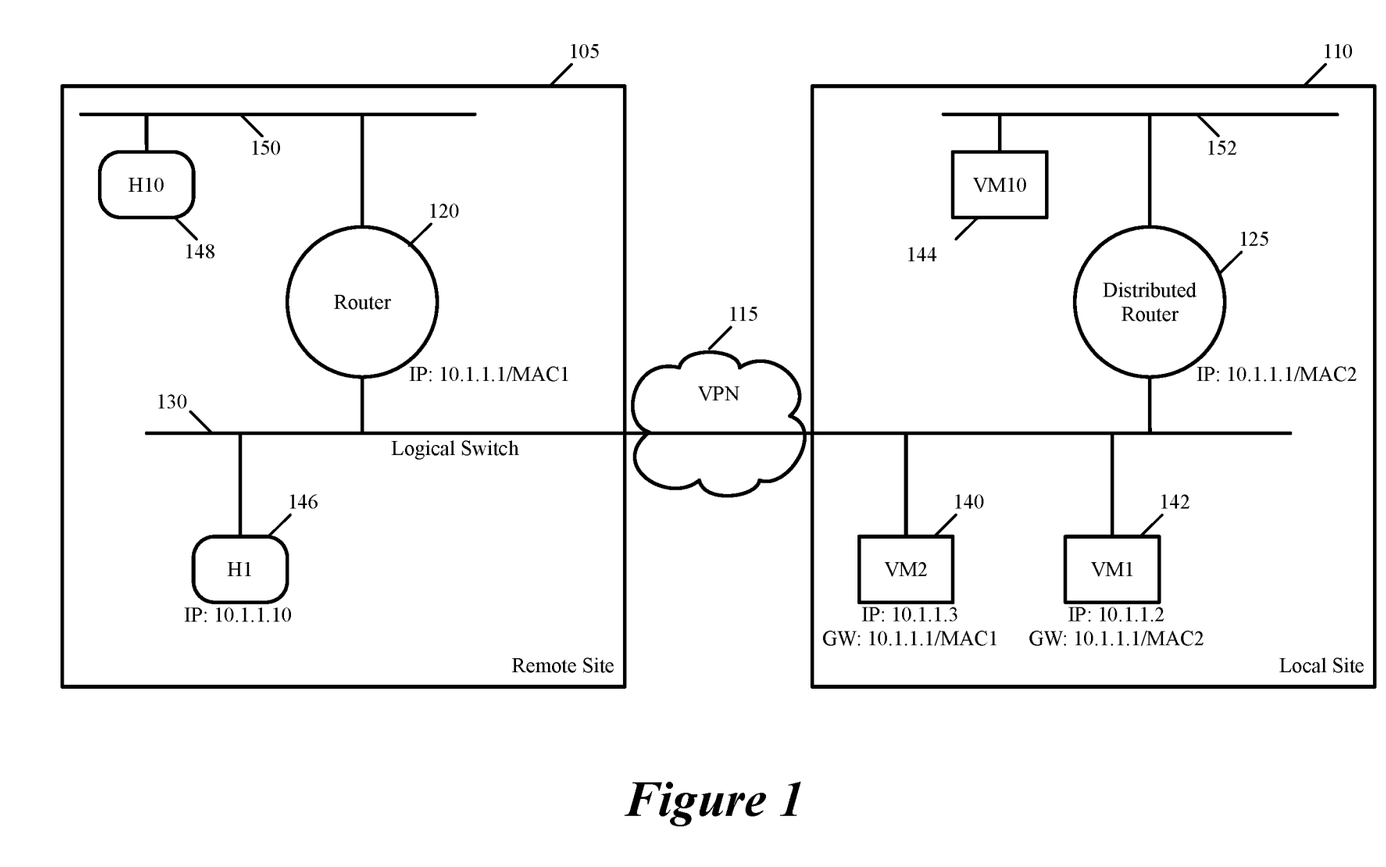
FIG. 1 conceptually illustrates a remote and local site connected by a virtual private network (VPN) and spanned by a logical switch, according to some embodiments.

FIG. 1 conceptually illustrates such first and second sites, according to some embodiments. As shown, remote site 105 and a local site 110 are connected by a VPN 115, and spanned by a logical switch 130. At the local site 110, the logical switch 130 connects to a distributed logical router 125, with DCNs 140-142 also connected to the logical switch 130. Additionally, a second logical switch 152 implemented at the local site 110 connects to the distributed logical router 125 and to a DCN 144. At the remote site 105, the first logical switch 130 connects to a router 120 (e.g., a physical router) and a host machine 146. An LFE 150 (e.g., a physical switch or logical switch) at the remote site 105 also connects to the router 120 and to a host machine 148. In this example, the DCNs 140-142 are virtual machines (VMs) hosted on host computers at the local site 110. The host machines 146 and 148, in some embodiments, may be computing devices that connect directly to the logical switch 130, or may host VMs or other DCNs that do so.

In order to ensure that IP traffic for each of the DCNs 140-144 is properly routed when any of the DCNs migrate from one site to another site (e.g., from the remote site 105 to the local site 110, and vice versa), while removing the need to reconfigure migrated DCNs, the default gateway IP for DCNs remains the same before and after migration. For example, while the DCNs 140-142 list a same IP address (e.g., 10.1.1.1) for their default gateway IP address, the default gateway MAC addresses listed are different (e.g., MAC1 and MAC2). Thus, the default gateway for the DCN 140 is the router 120 (because the DCN 140 was migrated from the remote site 105 to the local site 110), and the default gateway for the DCN 142 is the distributed logical router 125 (because the DCN 142 was originally created at the local site 110).

Figure 2:
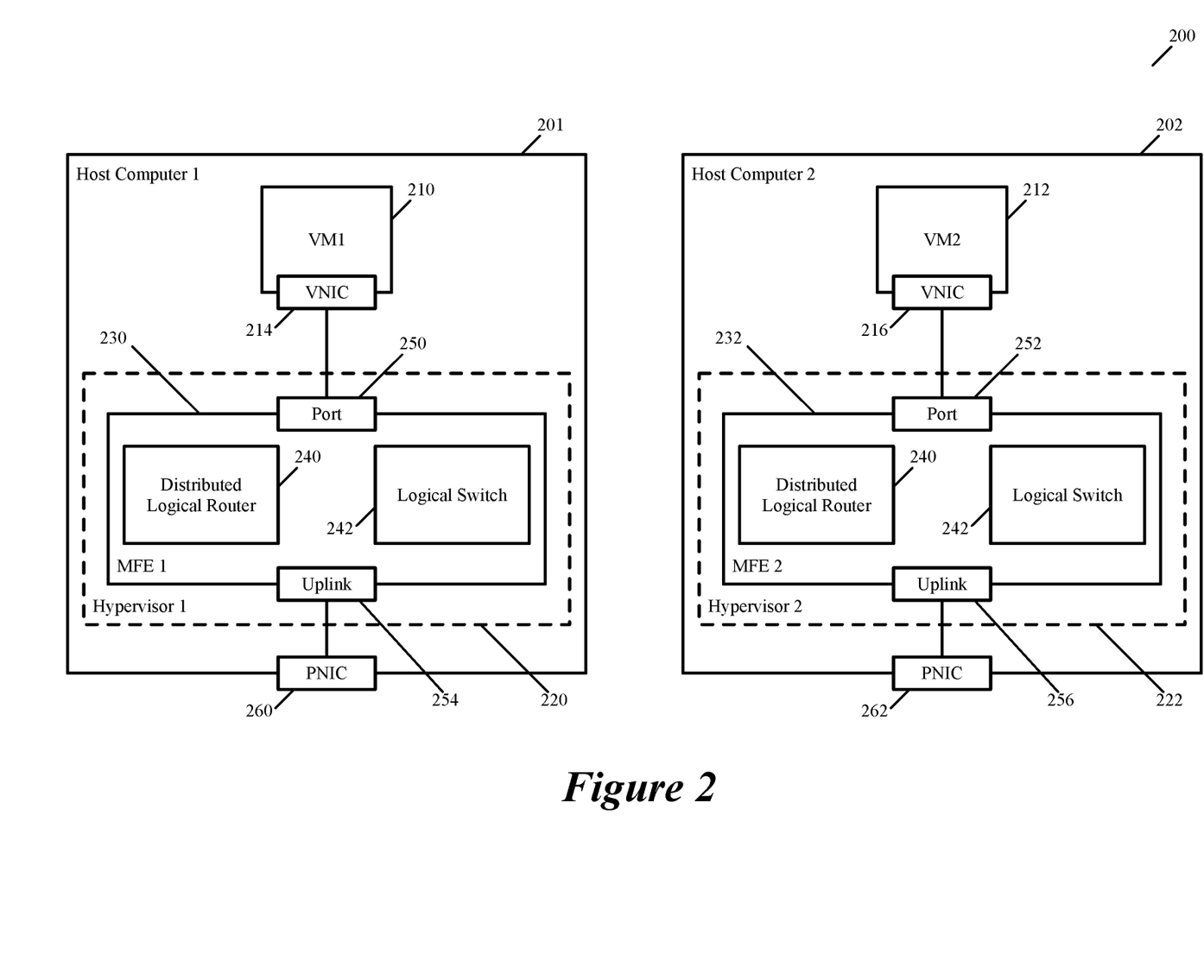
FIG. 2 conceptually illustrates a set of host computers at a local site spanned by a logical switch and a distributed logical router, according to some embodiments.

Each of the local and remote sites, in some embodiments, may include multiple host computers on which one or more DCNs execute. FIG. 2, for example, illustrates a local site 200 that includes a first host computer 201 and a second host computer 202. As shown, each host computer 201-202 includes a DCN 210-212 (e.g., the DCNs 140-142 shown in FIG. 1) and a hypervisor 220-222. In some embodiments, each hypervisor 220-222 includes an MFE 230-232 for implementing logical forwarding elements, such as the distributed router 240 and the logical switch 242, at each of the host computers 201-202 to implement a logical network (not shown).

The logical switch 242 logically connects the DCNs 210-212 to each other and to other logical and/or physical networks, according to some embodiments. The logical forwarding elements (e.g., the distributed router 240 and the logical switch 242) that logically connect the DCNs, in some embodiments, are part of a logical network topology for a particular user (e.g., a particular tenant) of a hosting system (e.g., the local site 200). In some embodiments, different DCNs or subsets of DCNs reside on different host computers (e.g., at the remote site 105) that execute MFEs in order to implement the logical network at the different host computers and to logically connect the different DCNs or subsets of DCNs.

The hypervisors 220-222, in some embodiments, also include local controllers (not shown) that receive logical network configuration data from one or more central controllers (not shown) for the local site 200. The local controllers receive logical network data (e.g., data for populating a routing table) from the one or more controllers of the local site, in some embodiments. The local controllers, in some embodiments, then convert the received logical network data for the MFEs that operate on the same hypervisor as the local controllers, and deliver the converted data to the MFEs.

The MFEs 230-232, in some embodiments, are software applications and/or processes that execute in the hypervisors 220-222 of the host computers 201-202. In addition to implementing the distributed router 240 and the logical switch 242, each of the MFEs 230-232 also includes (i) a port 250-252 for connecting to the virtual network interface controllers (VNICs) 214-216 of the DCNs 210-212, and (ii) an uplink 254-256 for connecting to the physical network interface cards (PNICs) 260-262 of the host computers 201-202. In some embodiments, the connections of the DCNs 210-212 to the logical switch 242 are defined using logical ports (not shown) of the logical switch 242, which are mapped to the physical ports (e.g., the ports 250-252) of the MFEs 230-232.

In some embodiments, the MFEs 230-232 perform network forwarding processing for the logical switch 242 when the MFEs receive packets from DCNs, such as DCNs 210-212, which couple to ports of the logical switch (not shown) in some embodiments. The MFEs 230-232 also perform forwarding processing for the distributed router 240, according to some embodiments. In some embodiments, the MFEs may also implement different sets of logical forwarding elements that belong to different logical networks (e.g., belonging to different tenants) to which DCNs hosted by the host computers belong.

In some embodiments, the MFE on a host computer is a flow-based MFE that implements both the logical switch and the distributed logical router (and, in some cases, additional logical switches and/or routers) using different tables. In other embodiments, the MFE on a host computer represents multiple different modules, such as a virtual switch for implementing the logical switch and a distributed virtual router module for implementing the distributed logical router.

It should be understood that the number of host machines, MFEs, and DCNs illustrated in the figure are exemplary and a logical network may span a multitude of host computers (and third-party hardware switches) and logically connect a large number of DCNs to each other, and to several other physical devices that may be connected to the hardware switches. Furthermore, while shown as VMs in this figure and other figures above and below, it should be understood that other types of DCNs (e.g., namespaces, containers, etc.) might connect to logical forwarding elements, according to some embodiments.

Additionally, it should be noted that while the embodiments described herein primarily reference ARP (i.e., IPv4

Proxy ARP), the methods are also applicable to IPv6 Neighbor Discover (ND) Proxy, which provides services similar to IPv4 Proxy ARP, in some embodiments. For example, in some embodiments, IPv6 ND Proxy is useful when bridging between multiple network segments cannot be done at the link layer. In some such embodiments, IPv6 ND Proxy allows the network segments to be bridged within a single subnet prefix.

Figure 3:
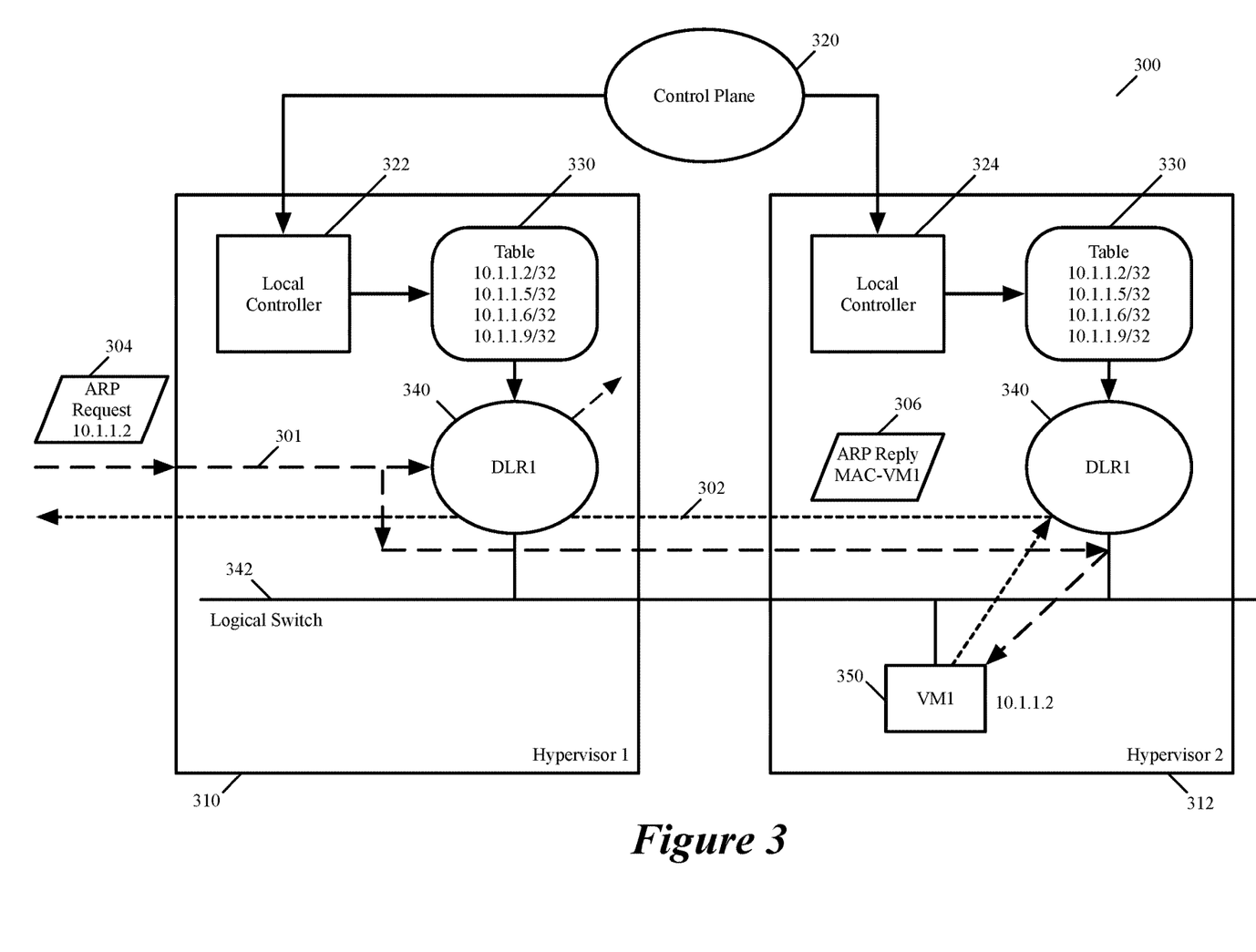
FIG. 3 conceptually illustrates an ARP request that is proxied by a distributed router at a local site, according to some embodiments.

FIG. 3 conceptually illustrates paths 301 and 302 of an ARP request 304 that is injected into a local site 300 at a first hypervisor 310, and a subsequent ARP reply 306, respectively. In addition to the first hypervisor 310, the local site 300 also includes a second hypervisor 312 and a (central) control plane 320. A logical switch 342 spans the first and second hypervisors 310-312, and connects (i) to a distributed logical router 340 that is implemented (e.g., by a set of MFEs) at each of the first and second hypervisors and (ii) to a DCN 350 with an IP address of 10.1.1.2 at the second hypervisor.

The hypervisors 310-312 also each include a local controller 322-324 and table 330 for the distributed logical router 340. The MFE implementing the distributed logical router 340 uses this table 330 to perform processing for the distributed logical router. As described above for FIG. 2, in some embodiments, the control plane 320 provides logical network configuration data to the local controllers 322-324. In some embodiments, the local controllers convert the received logical network configuration data and populate the table 330 at each of the first and second hypervisors 310-312 for use by the distributed logical router 340.

In some embodiments, the table 330 is populated at the hypervisors 310-312 by the local controllers 322-324 with a set of IP addresses that correspond to DCNs (e.g., VMs, containers, etc.) that (i) connect to the logical switch 342 and (ii) use the distributed logical router 340 as a default gateway. IP addresses for DCNs that connect to the logical switch 342 but that do not use the distributed logical router 340 as a default gateway are not included in the table 330. The distributed logical router 340 only proxies ARP requests for DCNs that use the distributed logical router as a default gateway (i.e., DCNs that correspond to the IP addresses in the table 330), according to some embodiments.

Figure 4:
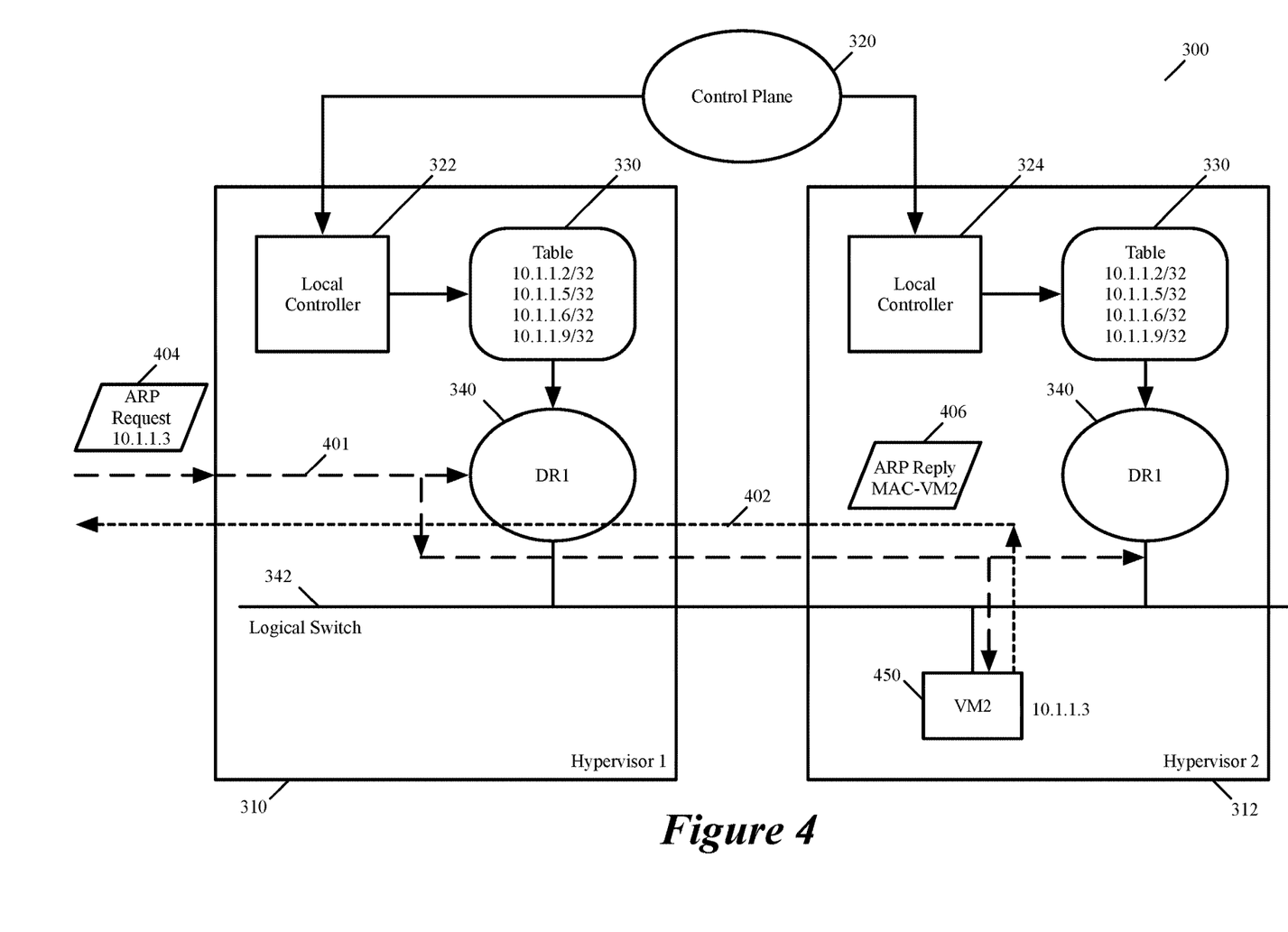
FIG. 4 conceptually illustrates an ARP request that is not proxied by a distributed router at a local site, according to some embodiments.

FIG. 4 illustrates the local site 300 in which an ARP request 404 for the IP address 10.1.1.3 is injected into the local site at the first hypervisor 310 along the path 401, and the subsequent ARP reply 406 on the return path 402. As shown, instead of the DCN 350, the hypervisor 312 now includes a DCN 450 with an IP address of 10.1.1.3 that connects to the logical switch 342. FIGS. 3 and 4 will be discussed in further detail below with reference to FIG. 5.

Figure 5:
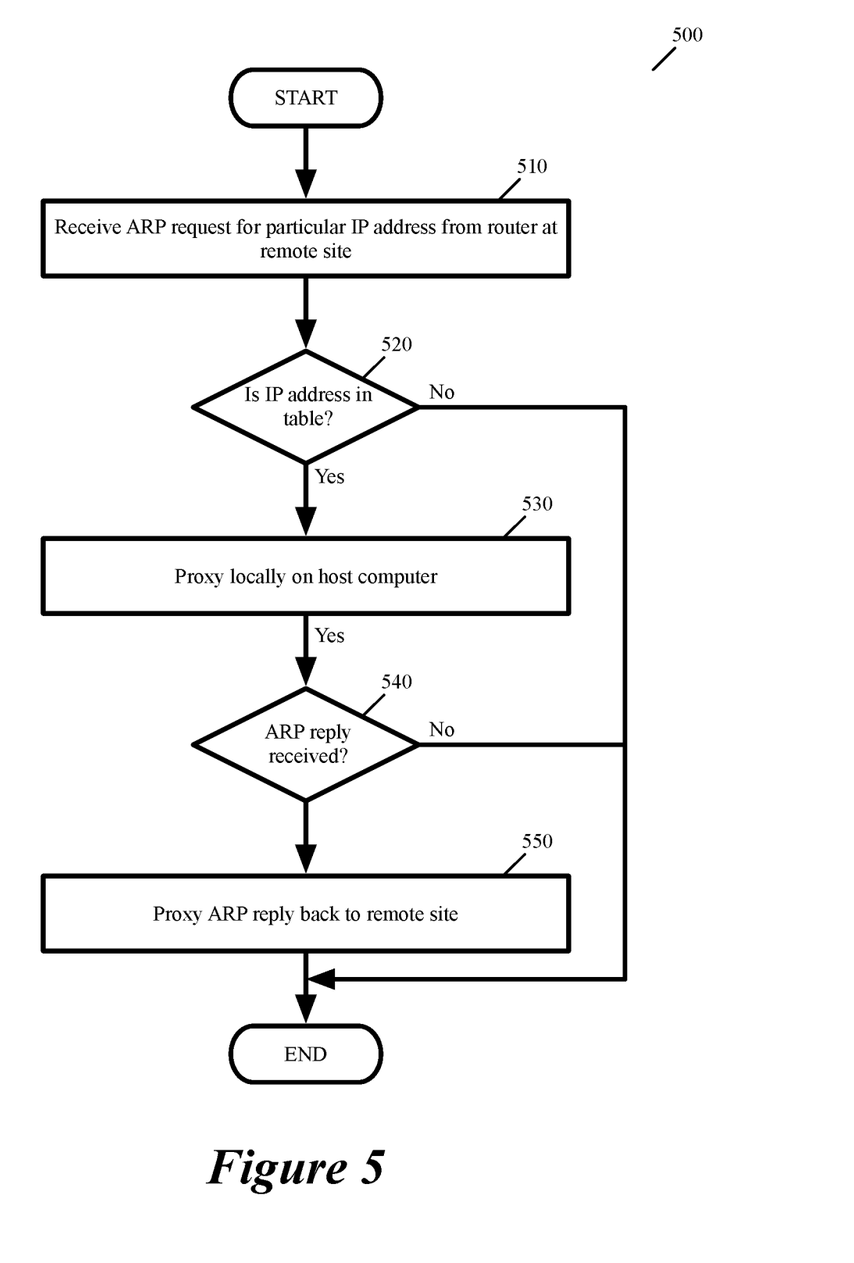
FIG. 5 conceptually illustrates a process for processing an ARP request at a local site, according to some embodiments.

FIG. 5 conceptually illustrates a process 500 for processing ARP requests to implement a distributed logical router. In some embodiments, this process 500 is performed by an MFE implementing a distributed logical router such as at any of the local sites 110, 200, and 300. The process 500 begins by receiving (at 510) an ARP request (e.g., one of ARP requests 304 and 404) for a particular IP address from a router of a remote site (e.g., router 120 of the remote site 105). In some embodiments, the ARP request is tunneled from the remote site to the local site, injected into a first hypervisor of the local site, such as the hypervisor 310 of local site 300, and proxied, via the logical switch 342, to other network elements at the local site that are connected to the same logical switch (e.g., the DCNs 350 and 450 on the hypervisor 312).

As illustrated in FIGS. 3 and 4, the ARP requests 304 and 404 are injected into the first hypervisor 310 and travel to the distributed logical router 340 on each of the first and second hypervisors 310-312. Next, the process 500 determines (at 520) whether the particular IP address in the ARP request is included in a table (e.g., table 330) with IP addresses of DCNs for which the distributed router acts as a default gateway. In some embodiments, as described above for FIGS. 2-4, the table is populated by local controllers based on logical network configuration data from the control plane of the local site.

When the process 500 determines at 520 that the IP address of the ARP request is not in the table, the process ends. In other words, when the distributed logical router 340 is not the default gateway for the DCN corresponding to the IP address of the ARP request, the distributed router does not do anything with the received ARP request, according to some embodiments. Instead, in some such embodiments, the DCN corresponding to the IP address of the ARP request receives the ARP request directly (e.g., via the logical switch 342).

For example, the path 401 of the ARP request 404 is illustrated as reaching the DCN 450 directly rather than from the distributed logical router 340. Additionally, as evidenced by the path 402, the DCN 450 sends the ARP reply 406, which includes a MAC address of the DCN 450, directly back to the requesting router at the remote site, rather than to the distributed logical router 340 at the second hypervisor 312. As the ARP reply 406 traverses back to the requesting router, the distributed logical router at the first hypervisor detects the ARP reply (e.g., as the router and distributed router share a same IP address), checks the destination MAC address of the ARP reply, and based on the destination MAC address, does not intercept the ARP reply.

Otherwise, when the process determines that the IP address is in the table, the process proxies, at 530, the ARP request to network elements on the host computer that connect to the logical switch. For example, the table 330 includes the IP address found in the ARP request 304 (e.g., 10.1.1.2). Accordingly, the distributed logical router 340 proxies the received ARP request at each of the first and second hypervisors 310-312 to network elements that connect to the logical switch 342. In some embodiments, the MFE implementing the distributed logical router may also store an ARP table so that the MFE can provide ARP replies without having to send the request to the DCNs. In this case, if the MFE has an ARP table mapping the requested IP address (e.g., 10.1.1.2) to the corresponding MAC address, the MFE would reply without having to forward the request to the DCN itself.

After proxying the ARP request at 530, the MFE awaits a reply. In some embodiments, the MFE only receives ARP replies from DCNs that execute on the same computer as the MFE. At 540, the process determines whether an ARP reply has been received. If an ARP reply is not received, the process ends (or loops to await an ARP reply for a particular period of time). Otherwise, if an ARP reply is received, the process transitions to 550 to proxy the received ARP reply back to the router at the remote site.

For example, the DCN 350, shown as having the IP address 10.1.1.2, receives the ARP request 304 from the distributed logical router 340 at the second hypervisor 312. As the DCN 350 is the DCN that corresponds to the IP address from the ARP request, the DCN 350 sends an ARP reply 306 back to the distributed logical router 340 (because the ARP request was proxied by the distributed logical router 340, and thus this appears as the source of the ARP request to the DCN 350). The distributed logical router then proxies the ARP reply 306 from the DCN 350 back to the requesting router at the remote site along the return path 302. The process 500 then ends.

Figure 6:
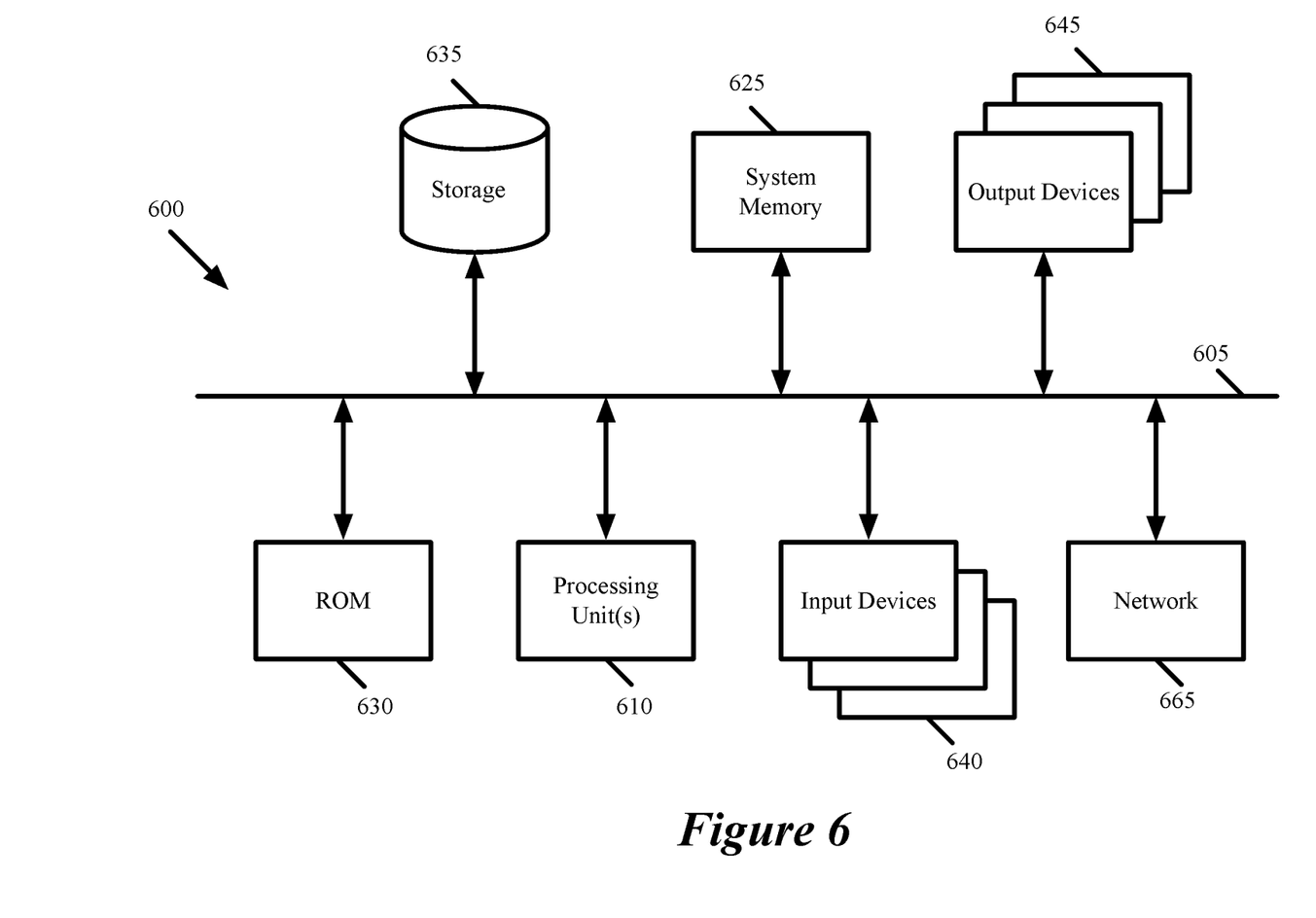
FIG. 6 conceptually illustrates a computer system with which some embodiments of the invention are implemented.

FIG. 6 conceptually illustrates a computer system 600 with which some embodiments of the invention are implemented. The computer system 600 can be used to implement any of the above-described hosts, controllers, and managers. As such, it can be used to execute any of the above-described processes. This computer system includes various types of non-transitory machine readable media and interfaces for various other types of machine readable media. Computer system 600 includes a bus 605, processing unit(s) 610, a system memory 625, a read-only memory 630, a permanent storage device 635, input devices 640, and output devices 645.

The bus 605 collectively represents all system, peripheral, and chipset buses that communicatively connect the numerous internal devices of the computer system 600. For instance, the bus 605 communicatively connects the processing unit(s) 610 with the read-only memory 630, the system memory 625, and the permanent storage device 635.

From these various memory units, the processing unit(s) 610 retrieve instructions to execute and data to process in order to execute the processes of the invention. The processing unit(s) may be a single processor or a multi-core processor in different embodiments. The read-only-memory (ROM) 630 stores static data and instructions that are needed by the processing unit(s) 610 and other modules of the computer system. The permanent storage device 635, on the other hand, is a read-and-write memory device. This device is a non-volatile memory unit that stores instructions and data even when the computer system 600 is off. Some embodiments of the invention use a mass-storage device (such as a magnetic or optical disk and its corresponding disk drive) as the permanent storage device 635.

Other embodiments use a removable storage device (such as a floppy disk, flash drive, etc.) as the permanent storage device. Like the permanent storage device 635, the system memory 625 is a read-and-write memory device. However, unlike storage device 635, the system memory is a volatile read-and-write memory, such a random access memory. The system memory stores some of the instructions and data that the processor needs at runtime. In some embodiments, the invention's processes are stored in the system memory 625, the permanent storage device 635, and/or the read-only memory 630. From these various memory units, the processing unit(s) 610 retrieve instructions to execute and data to process in order to execute the processes of some embodiments.

The bus 605 also connects to the input and output devices 640 and 645. The input devices enable the user to communicate information and select commands to the computer system. The input devices 640 include alphanumeric keyboards and pointing devices (also called "cursor control devices"). The output devices 645 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 6, bus 605 also couples computer system 600 to a network 665 through a network adapter (not shown). In this manner, the computer can be a part of a network of computers (such as a local area network ("LAN"), a wide area network ("WAN"), or an Intranet, or a network of networks, such as the Internet. Any or all components of computer system 600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

This specification refers throughout to computational and network environments that include VMs. However, VMs are merely one example of DCNs, also referred to as addressable nodes. DCNs may include non-virtualized physical hosts, virtual machines, containers that run on top of a host operating system without the need for a hypervisor or a separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks and sites could include combinations of different types of DCNs, in some embodiments.

Also, several figures (e.g., FIG. 5) conceptually illustrate processes of some embodiments of the invention. In other embodiments, the specific operations of these processes may not be performed in the exact order shown and described in these figures. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

The invention claimed is:

1. A method for proxying address resolution protocol (ARP) requests, the method comprising:
at a managed forwarding element (MFE) that executes on a host computer operating at a first site to implement a distributed router along with at least one additional MFE at the first site:
from a router at a remote second site, receiving an ARP request for a particular network address associated with a logical switch that spans the first site and the remote second site, wherein both the distributed router and the router at the remote second site connect to the logical switch;
determining whether a table comprising network addresses for a set of data compute nodes (DCNs) for which the distributed router is a default gateway includes the particular network address; and
when the particular network address is in the table, proxying the ARP request at the host computer, wherein the MFE does not proxy the ARP request when the particular network address is not in the table.

2. The method of claim 1, wherein proxying the ARP request comprises sending the ARP request to DCNs executing on the host computer that connect to the logical switch.

3. The method of claim 2 further comprising, in response to proxying the ARP request at the host computer, receiving an ARP reply from a particular DCN corresponding to the particular network address and executing on the host computer, the ARP reply comprising a data link address for the particular DCN.

4. The method of claim 3, wherein the MFE proxies the ARP reply from the particular DCN to the router at the remote second site.

5. The method of claim 1, wherein the MFE is a first MFE, the host computer is a first host computer, the at least one additional MFE comprises a second MFE that executes on a second host computer operating at the first site to implement the distributed router along with the first MFE, and the table is a first table stored at the first host computer, wherein the second MFE:
receives the ARP request for the particular network address from the router at the remote second site;
determines whether a second table stored at the second host computer and comprising network addresses for the set of DCNs for which the distributed router is the default gateway includes the particular network address; and
proxies the ARP request at the second host computer when the particular network address is in the second table, wherein the second MFE does not proxy the ARP request when the particular network address is not in the table.

6. The method of claim 5, wherein when a particular DCN that corresponds to the particular network address executes on the second host computer, (i) the second MFE receives from the particular DCN an ARP reply comprising a data link address of the particular DCN and (ii) the first MFE does not receive an ARP reply from the particular DCN.

7. The method of claim 6, wherein the second MFE proxies the ARP reply from the particular DCN back to the remote second site.

8. The method of claim 7, wherein the first MFE checks a destination data link address of the proxied ARP reply, and, based on the destination data link address of the proxied ARP reply, does not intercept the proxied ARP reply.

9. The method of claim 1, wherein when the MFE does not proxy the ARP request after determining that the particular network address is not in the table, a particular DCN that corresponds to the particular network address and executes on the host computer receives the ARP request directly and sends an ARP reply back to the remote second site.

10. The method of claim 9, wherein the MFE checks a destination data link address of the proxied ARP reply, and based on the destination data link address of the proxied ARP reply, does not intercept the proxied ARP reply.

11. The method of claim 1, wherein the router at the remote second site and the distributed router at the first site share a same gateway network address.

12. The method of claim 1, wherein the table is populated by a network management system for the first site.

13. The method of claim 1, wherein the MFE only proxies ARP requests comprising network addresses that correspond to DCNs for which the distributed router is the default gateway.

14. A non-transitory machine readable medium storing a managed forwarding element (MFE) which when executed by at least one processing unit of a host computer operating at a first site proxies address resolution protocol (ARP) requests, the MFE comprising sets of instructions for:
implementing a distributed router, wherein at least one additional MFE at the first site also implements the distributed router;
from a router at a remote second site, receiving an ARP request for a particular network address associated with a logical switch that spans the first site and the remote second site, wherein both the distributed router and the router at the remote second site connect to the logical switch using a same gateway network address and different data link addresses;
determining whether a table comprising network addresses for a set of data compute nodes (DCNs) for which the distributed router is a default gateway includes the particular network address; and when the particular network address is in the table, proxying the ARP request at the host computer, wherein the MFE does not proxy the ARP request when the particular network address is not in the table.

15. The non-transitory machine readable medium of claim 14, wherein the set of instructions for proxying the ARP request further comprises a set of instructions for proxying the ARP request to DCNs executing on the host computer that connect to the logical switch.

16. The non-transitory machine readable medium of claim 15, wherein the MFE further comprises a set of instructions for receiving, in response to proxying the ARP request at the host computer, an ARP reply from a particular DCN corresponding to the particular network address and executing on the host computer, the ARP reply comprising a data link address for the particular DCN, wherein the MFE proxies the ARP reply from the particular DCN to the router at the remote site.

17. The non-transitory machine readable medium of claim 14, wherein the MFE is a first MFE, the host computer is a first host computer, the at least one additional MFE comprises a second MFE that executes on a second host computer operating at the first site to implement the distributed router along with the first MFE, and the table is a first table stored at the first host computer, wherein the second MFE:
receives the ARP request for the particular network address from the router at the remote second site;
determines whether a second table stored at the second host computer and comprising network addresses for the set of DCNs for which the distributed router is the default gateway includes the particular network address; and
proxies the ARP request at the second host computer when the particular network address is in the second table, wherein the second MFE does not proxy the ARP request when the particular network address is not in the table.

18. The non-transitory machine readable medium of claim 17, wherein when a particular DCN that corresponds to the particular network address executes on the second host computer, (i) the second MFE receives from the particular DCN an ARP reply comprising a data link address of the particular DCN and (ii) the first MFE does not receive an ARP reply from the particular DCN, wherein the second MFE proxies the ARP reply from the particular DCN back to the remote second site.

19. The non-transitory machine readable medium of claim 14, wherein when the MFE does not proxy the ARP request after determining that the particular network address is not in the table, a particular DCN that corresponds to the particular network address and executes on the host computer receives the ARP request directly and sends an ARP reply back to the remote second site.

20. The non-transitory machine readable medium of claim 14, wherein the MFE only proxies ARP requests comprising network addresses that correspond to DCNs for which the distributed router is the default gateway.

* * * * *